(12) United States Patent
Lin et al.

(10) Patent No.: US 8,169,690 B2
(45) Date of Patent: May 1, 2012

(54) COLOR DISPLAY DEVICES

(75) Inventors: Craig Lin, San Jose, CA (US); Robert A. Sprague, Saratoga, CA (US)

(73) Assignee: Sipix Imaging, Inc., Fremont, CA (US)

( * ) Notice: Subject to any disclaimer, the term of this patent is extended or adjusted under 35 U.S.C. 154(b) by 230 days.

(21) Appl. No.: 12/370,485

(22) Filed: Feb. 12, 2009

(65) Prior Publication Data

US 2009/0213452 A1    Aug. 27, 2009

Related U.S. Application Data

(60) Provisional application No. 61/030,489, filed on Feb. 21, 2008.

(51) Int. Cl.
    *G02B 26/00* (2006.01)
(52) U.S. Cl. ....................................... 359/296
(58) Field of Classification Search ........... 359/294–297
    See application file for complete search history.

(56) References Cited

U.S. PATENT DOCUMENTS

| | | | |
|---|---|---|---|
| 3,892,568 A | 7/1975 | Ota | |
| 4,298,448 A | 11/1981 | Muller et al. | |
| 5,378,574 A | 1/1995 | Winnik et al. | |
| 5,980,719 A | 11/1999 | Cherukuri et al. | |
| 6,198,809 B1 | 3/2001 | Disanto et al. | |
| 6,337,761 B1 | 1/2002 | Rogers et al. | |
| 6,373,461 B1 | 4/2002 | Hasegawa et al. | |
| 6,486,866 B1 | 11/2002 | Kuwahara et al. | |
| 6,538,801 B2 | 3/2003 | Jacobson et al. | |
| 6,693,620 B1 | 2/2004 | Herb et al. | |
| 6,704,133 B2 | 3/2004 | Gates et al. | |
| 6,724,521 B2* | 4/2004 | Nakao et al. | 359/296 |
| 6,729,718 B2 | 5/2004 | Goto et al. | |
| 6,788,449 B2 | 9/2004 | Liang et al. | |
| 6,864,875 B2 | 3/2005 | Drzaic et al. | |
| 7,009,756 B2* | 3/2006 | Kishi et al. | 359/296 |
| 7,038,655 B2 | 5/2006 | Herb et al. | |
| 7,038,670 B2 | 5/2006 | Liang et al. | |

(Continued)

FOREIGN PATENT DOCUMENTS

EP    1 089 118    4/2001

(Continued)

OTHER PUBLICATIONS

International Search Report for PCT/US09/33954, mailed Apr. 6, 2009.

(Continued)

*Primary Examiner* — Ricky Mack
*Assistant Examiner* — Vipin Patel
(74) *Attorney, Agent, or Firm* — Perkins Coie LLP.

(57) ABSTRACT

The present invention is directed to color display devices. The color display devices comprise display cells which is capable of displaying multiple color states. The display device may also comprise black matrix layers or a brightness enhancement structure on the viewing side. The present invention is directed to a display device comprising a plurality of display cells, wherein each of said display cells is sandwiched between a first layer comprising a common electrode and a second layer comprising a plurality of driving electrodes and at least one of the driving electrodes is a designated electrode, and said display device further comprises blocking layers on its viewing side and said blocking layers are located in positions corresponding to the designated electrodes.

23 Claims, 15 Drawing Sheets

U.S. PATENT DOCUMENTS

| | | |
|---|---|---|
| 7,046,228 B2 | 5/2006 | Liang et al. |
| 7,050,218 B2 | 5/2006 | Kanbe |
| 7,075,502 B1 | 7/2006 | Drzaic et al. |
| 7,283,199 B2 | 10/2007 | Aichi et al. |
| 7,365,732 B2 | 4/2008 | Matsuda et al. |
| 7,417,787 B2 | 8/2008 | Chopra et al. |
| 7,545,557 B2 | 6/2009 | Iftime et al. |
| 7,548,291 B2 | 6/2009 | Lee et al. |
| 2002/0033792 A1 | 3/2002 | Inoue |
| 2002/0171620 A1 | 11/2002 | Gordon et al. |
| 2003/0002132 A1 | 1/2003 | Foucher et al. |
| 2003/0095094 A1 | 5/2003 | Goden |
| 2003/0107631 A1 | 6/2003 | Goto et al. |
| 2003/0132908 A1 | 7/2003 | Herb et al. |
| 2004/0051935 A1 | 3/2004 | Katase |
| 2004/0113884 A1 | 6/2004 | Albert et al. |
| 2004/0136048 A1 | 7/2004 | Arango et al. |
| 2004/0263947 A1 | 12/2004 | Drzaic et al. |
| 2005/0151709 A1* | 7/2005 | Jacobson et al. ............... 345/84 |
| 2005/0190431 A1 | 9/2005 | Matsuda |
| 2009/0034054 A1* | 2/2009 | Ikegami et al. ............... 359/296 |
| 2009/0251763 A1 | 10/2009 | Sprague et al. |
| 2009/0273827 A1 | 11/2009 | Lin et al. |
| 2010/0053728 A1 | 3/2010 | Lin et al. |
| 2010/0165005 A1 | 7/2010 | Sprague et al. |
| 2010/0165448 A1 | 7/2010 | Sprague et al |

FOREIGN PATENT DOCUMENTS

| | | | |
|---|---|---|---|
| JP | WO2007/013682 | * | 2/2007 |
| WO | WO 99/53373 | | 10/1999 |
| WO | WO 03/016993 | | 2/2003 |
| WO | WO 2008/122927 A1 | | 10/2008 |
| WO | WO 2009/124142 | | 10/2009 |
| WO | WO 2009/134889 | | 11/2009 |
| WO | WO 2010/027810 | | 3/2010 |

OTHER PUBLICATIONS

U.S. Appl. No. 13/038,255, filed Mar. 1, 2011, Sprague.
U.S. Appl. No. 13/092,052, filed Apr. 21, 2011, Sprague et al.

* cited by examiner

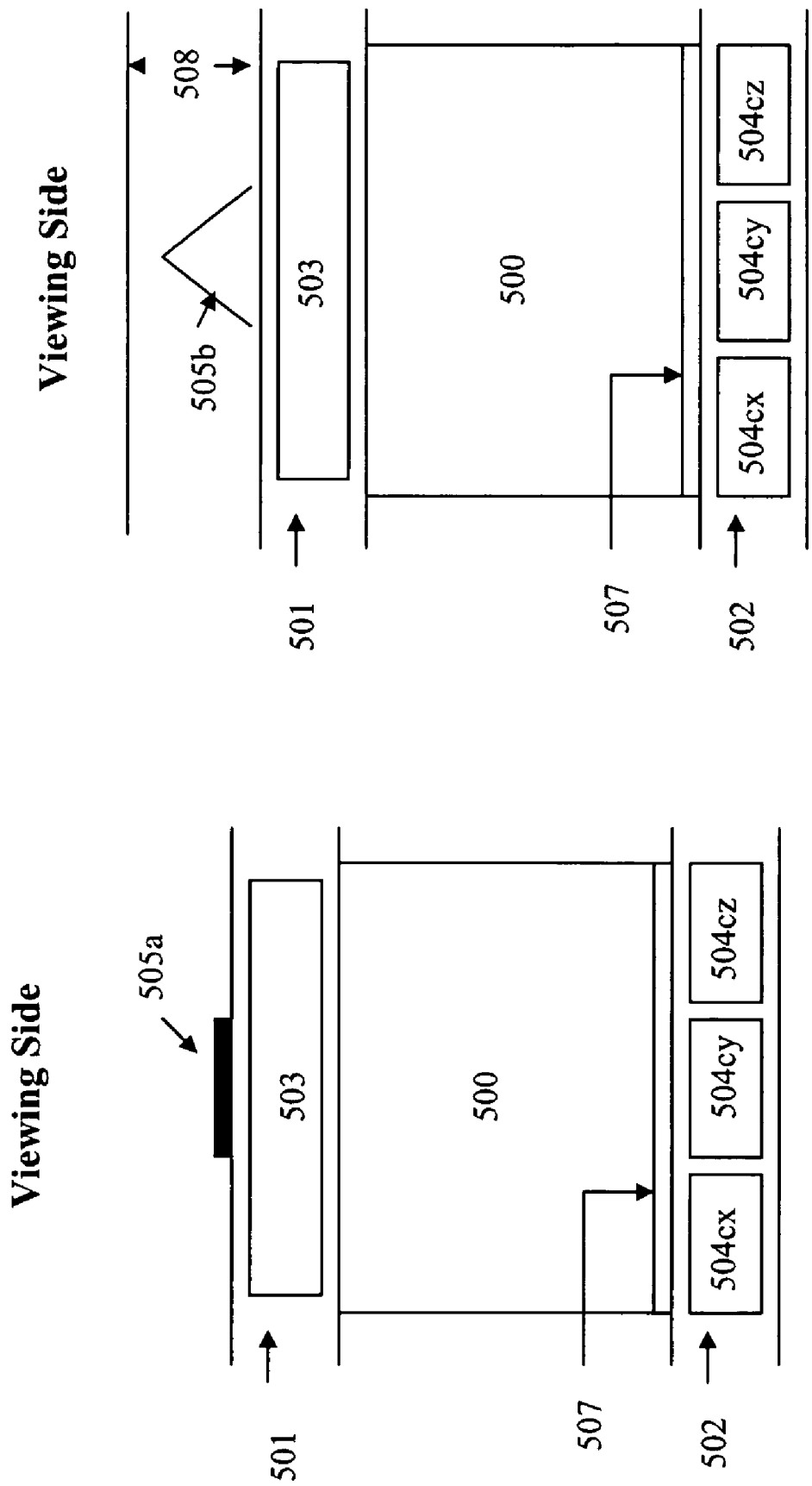

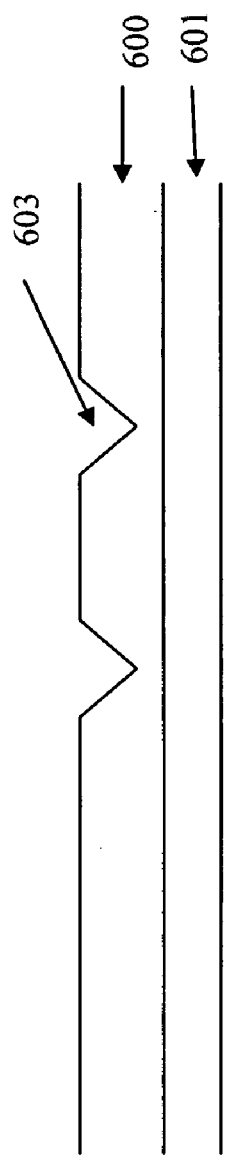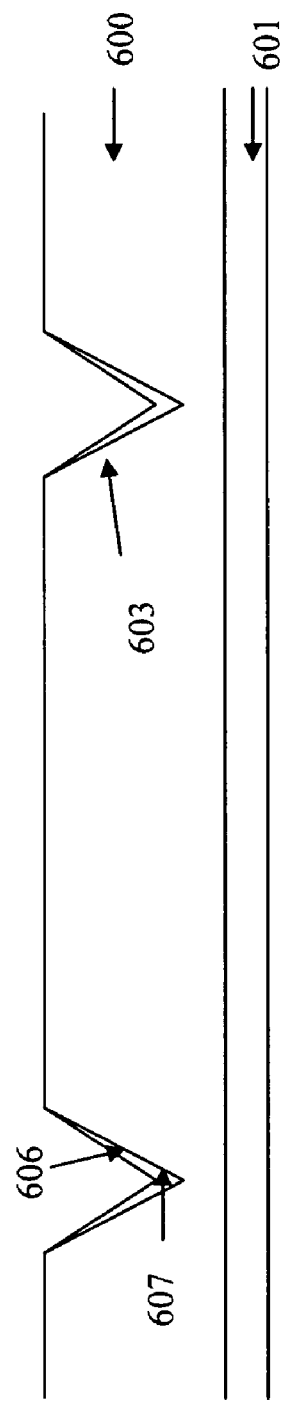

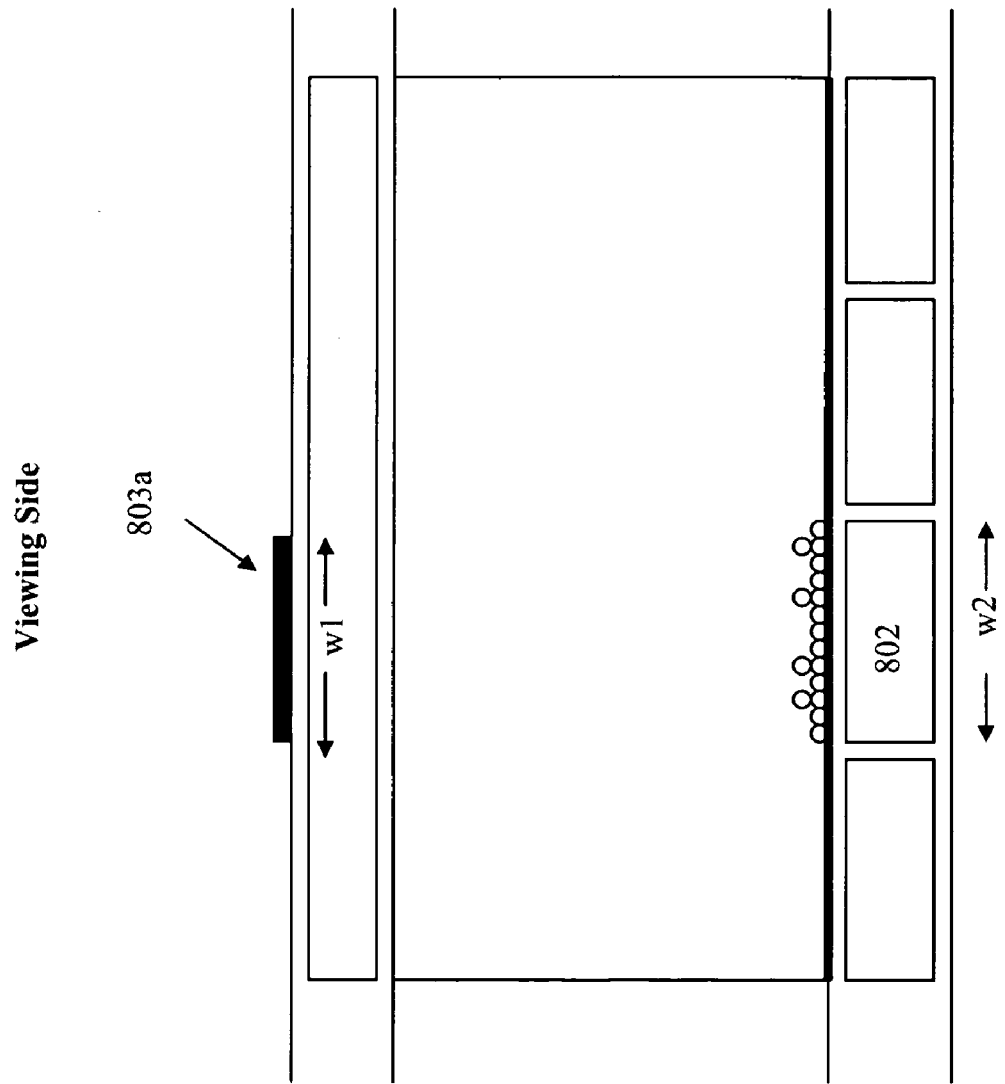

COLOR DISPLAY DEVICES

This application claims the benefit of U.S. Provisional Application No. 61/030,489, filed Feb. 21, 2008, which is incorporated herein by reference in its entirety.

FIELD OF THE INVENTION

The present invention is directed to color display devices. The color display devices comprise display cells which are capable of displaying multiple color states. The display device may also comprise black matrix layers or a brightness enhancement structure on the viewing side.

BACKGROUND OF THE INVENTION

U.S. Pat. No. 7,046,228 discloses an electrophoretic display device having a dual switching mode which allows the charged pigment particles in a display cell to move in either the vertical (up/down) direction or the planar (left/right) direction.

In such a display device, each of the display cells is sandwiched between two layers, one of which comprises a transparent top electrode, whereas the other layer comprises a bottom electrode and at least one in-plane electrode. Typically, the display cells are filled with a clear, but colored dielectric solvent or solvent mixture with charged white pigment particles dispersed therein. The background color of the display cells may be black. When the charged pigment particles are driven to be at or near the transparent top electrode, the color of the particles is seen, from the top viewing side. When the charged pigment particles are driven to be at or near the bottom electrode, the color of the solvent is seen, from the top viewing side. When the charged pigment particles are driven to be at or near the in-plane electrode(s), the color of the display cell background is seen, from the top viewing side. Accordingly, each of the display cells is capable of displaying three color states, i.e., the color of the charged pigment particles, the color of the dielectric solvent or solvent mixture or the background color of the display cell.

The dual mode electrophoretic display, according to the patent, may be driven by an active matrix system or by a passive matrix system.

The present invention is directed to alternative designs of color display devices.

SUMMARY OF THE INVENTION

The first aspect of the invention is directed to a display device comprising a plurality of display cells, wherein each of said display cells is sandwiched between a first layer comprising a common electrode and a second layer comprising a plurality of driving electrodes and at least one of the driving electrodes is a designated electrode, and said display device further comprises blocking layers on its viewing side and said blocking layers are located in positions corresponding to the at least one designated electrode.

In one embodiment, the blocking layers are black matrix layers. In one embodiment, the width of the black matrix layers is equal to or greater than the width of the designated electrodes.

In another embodiment, the blocking layers are micro-structures or micro-reflectors of a brightness enhancement structure. In one embodiment, the width of the base of the micro-structures or micro-reflectors is equal to or greater than the width of the designated electrodes.

In one embodiment, the brightness enhancement structure is two-dimensional. In another embodiment, the brightness enhancement structure is one-dimensional.

In one embodiment, the display cells are filled with a display fluid.

In one embodiment, the display fluid comprises charged pigment particles dispersed in a solvent or solvent mixture.

In one embodiment, each display cell is capable of displaying the color of the charged pigment particles, the color of the solvent or solvent mixture or a background color.

In one embodiment, the driving electrodes are not aligned with the boundary of the display cells.

In another embodiment, the driving electrodes are aligned with the boundary of the display cells.

In one embodiment, the charged pigment particles move to the designated electrode(s) all at once. In another embodiment, the charged pigment particles move to the designated electrode(s) in steps.

In one embodiment, the charged pigment particles are of the white color.

In one embodiment, the background color is of the black color.

In one embodiment, the display device further comprises color filters.

In one embodiment of the display device with color filters, the charged pigment particles are of the white color. In another embodiment, the charged pigment particles are of the black color.

In one embodiment of the display device, the driving electrodes are a grid of at least 2×2.

In one embodiment, the first layer is on the viewing side. In another embodiment, the second layer is on the viewing side.

In one embodiment, some of the driving electrodes are connected as one non-designated electrode and the remaining one driving electrode is the designated electrode. In another embodiment, some of the driving electrodes are connected as one non-designated electrode and the remaining driving electrodes are connected as a designated electrode.

The second aspect of the invention is directed to a display device comprising a plurality of display cells, wherein each of the display cells is sandwiched between a first layer comprising a common electrode and a second layer comprising a plurality of driving electrodes and at least one of the driving electrodes is a designated electrode, and the driving electrodes are transparent, except the at least one designated electrode. In one embodiment, the designated electrode(s) are opaque.

The display devices of the present invention not only show improved performance, but also can be manufactured by simplified processes at low cost. In addition, the display devices provide better control of the movement of the charged pigment particles, and consequently a higher contrast ratio may be achieved. The light leakage problem may also be solved.

BRIEF DESCRIPTION OF THE DRAWINGS

FIGS. 2a-2c illustrate how different color states may be displayed by the display cell of FIG. 1a.

FIG. 5a depicts a color display of the present invention with black matrix layers on the viewing side of the display.

FIG. 5b depicts a color display of the present invention with a brightness enhancement structure on the viewing side of the display.

FIGS. 6a-6g show examples of how a brightness enhancement structure may be fabricated.

FIGS. 8a and 8b show how the black matrix layers and the micro-structure or micro-reflector are aligned with designated electrodes, respectively.

DETAILED DESCRIPTION OF THE INVENTION

Figure 1B:
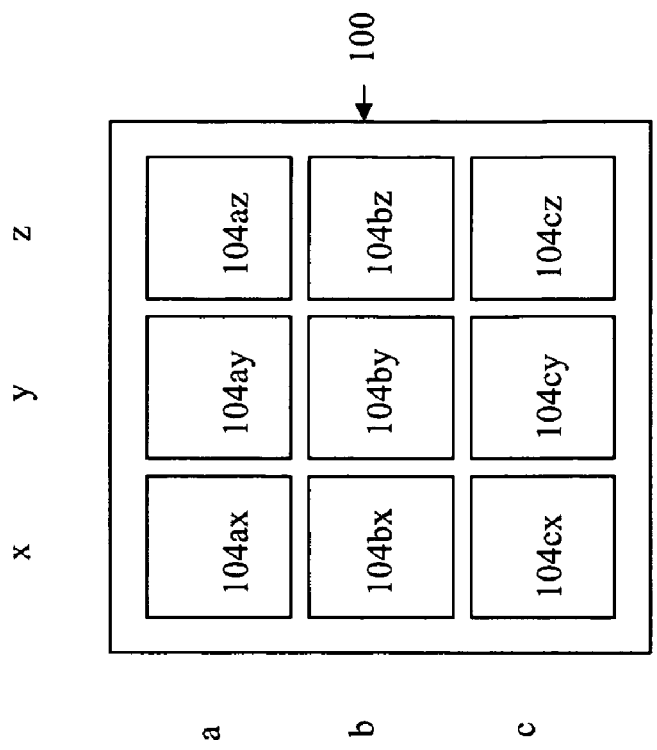
FIG. 1b depicts a top view of the layer comprising driving electrodes.
Figure 1A:
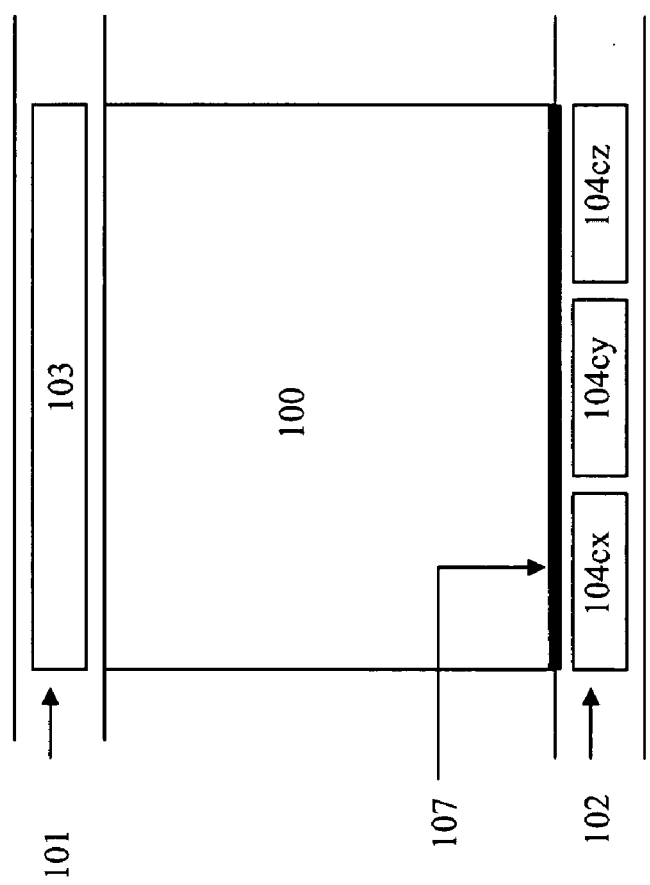
FIG. 1a depicts a cross-section view of a display cell of a color display device of the present invention.

FIG. 1a depicts a cross-section view of a display cell of a color display device of the present invention. The display cell (100) is sandwiched between a first layer (101) and a second layer (102). The first layer comprises a common electrode (103). The second layer comprises more than one driving electrodes, with only 104cx, 104cy and 104cz shown.

In one embodiment, each display cell, as shown in FIG. 1a, represents a single pixel.

FIG. 1b depicts the top view of the layer comprising driving electrodes of the display cell of FIG. 1a. As shown, the second layer (102) comprises 3×3 driving electrodes, denoted as 104ax, 104ay, 104az, 104bx, 104by, 104bz, 104cx, 104cy and 104cz. While only a 3×3 grid is shown, the second layer may comprise any grid which is at least 2×2. The size of the driving electrodes may vary, depending on the size of the display cell. There is a gap between the driving electrodes. In other words, the driving electrodes are not in contact with each other.

In the context of the present invention, the driving electrode(s) intended for the charged pigment particles to gather in order to display the background color of the display cell is/are referred to as the "designated electrode(s)".

The multiple driving electrodes within a display cell allow the particles to migrate to one or more designated electrodes or evenly spread over all the driving electrodes.

The 9 driving electrodes in FIG. 1b are shown to have the same shape and size. It is understood that the shapes and sizes the driving electrodes in the same display device may vary, as long as they serve the desired functions.

The common electrode (103) is usually a transparent electrode layer (e.g., ITO), spreading over the entire top of the display device. The driving electrodes (104s) are described in U.S. Pat. No. 7,046,228, the content of which is incorporated herein by reference in its entirety.

It is noted that while the driving electrodes are specifically mentioned for the second layer (102), the scope of the present invention encompasses other types of electrode addressing as long as the electrodes serve the same functions.

It is also shown in FIG. 1b that the 9 driving electrodes are aligned with the boundary of the display cell (100). However, for this type of color display, this feature is optional. Details of an un-aligned configuration are given below.

There is also a background layer (107) in the display cell to provide a background color. The background layer may be on top of the driving electrodes (as shown) or underneath the driving electrodes (not shown). The layer of the driving electrodes, i.e., the second layer, may also serve as the background layer.

While the first layer (101) is shown in most of drawings as the viewing side, it is noted that it is also possible for the second layer (102) to be on the viewing side.

Figure 2C:
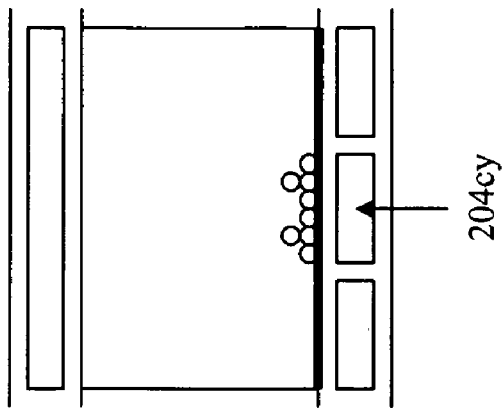
Figure 2B:
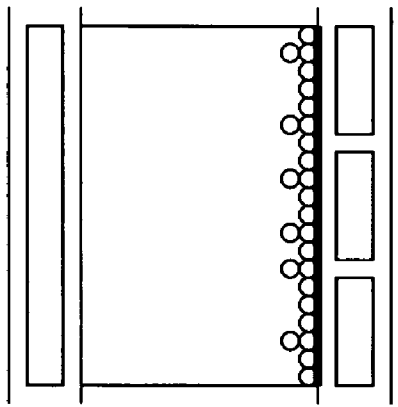
Figure 2A:
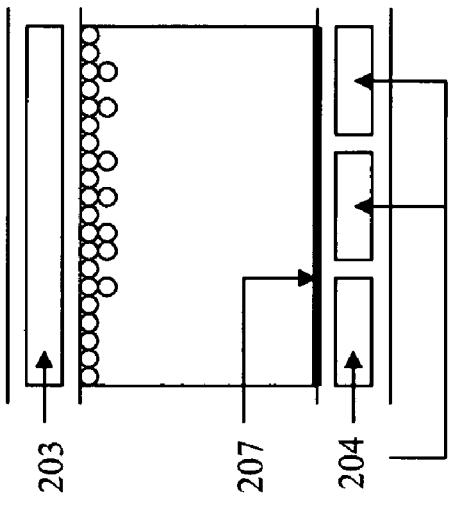

FIGS. 2a-2c illustrates how different color states may be displayed by the display cell of FIG. 1a. For illustration purpose, it is assumed that the charged pigment particles are of the white color, the dielectric solvent or solvent mixture in which the pigment particles are dispersed is colored (e.g., red, green, blue or other colors) and the background layer is of the black color. The features and associated numbers in FIGS. 2a, 2b and 2c are identical.

The term "color" referred to in this application may be a single color, a mid-tone color or a composite color.

It is also assumed that only the driving electrode 204cy is a designated electrode and the remaining driving electrodes on the second layer are all non-designated electrodes.

In FIG. 2a, the voltages of the common (203) and driving (204) electrodes are set at such to cause the charged white particles to migrate to be at or near the common electrode (203) and as a result, the white color (i.e., the color of the particles) is seen, from the viewing side.

In FIG. 2b, the voltages of the common (203) and driving (204) electrodes are set at such to cause the charged white particles to migrate to be at or near the driving electrodes (204s) and as a result, the color of the solvent is seen, from the viewing side.

In FIG. 2c, the voltages of the common (203) and driving (204) electrodes are set at such to cause the charged pigment particles to migrate to be at or near one of the driving electrodes (e.g., 204cy, "designated electrode"). As a result, the color of the background layer (207) is seen, from the viewing side. While only one driving electrode (204cy) is shown to be designed for this purpose, in practice, the number of such designated electrodes may be more than one. In other words, there may be one or more such designated electrodes on the second layer. The one designated electrode or multiple designated electrodes may be any of the driving electrodes, location wise.

In the context of the present invention, the driving electrode(s) intended for the charged pigment particles to gather in order to display the background color of the display cell is/are referred to as the "designated electrode(s)" and the driving electrodes not intended for the charged pigment particles to gather when displaying the background color are referred to as the "non-designated electrodes".

Figure 3:
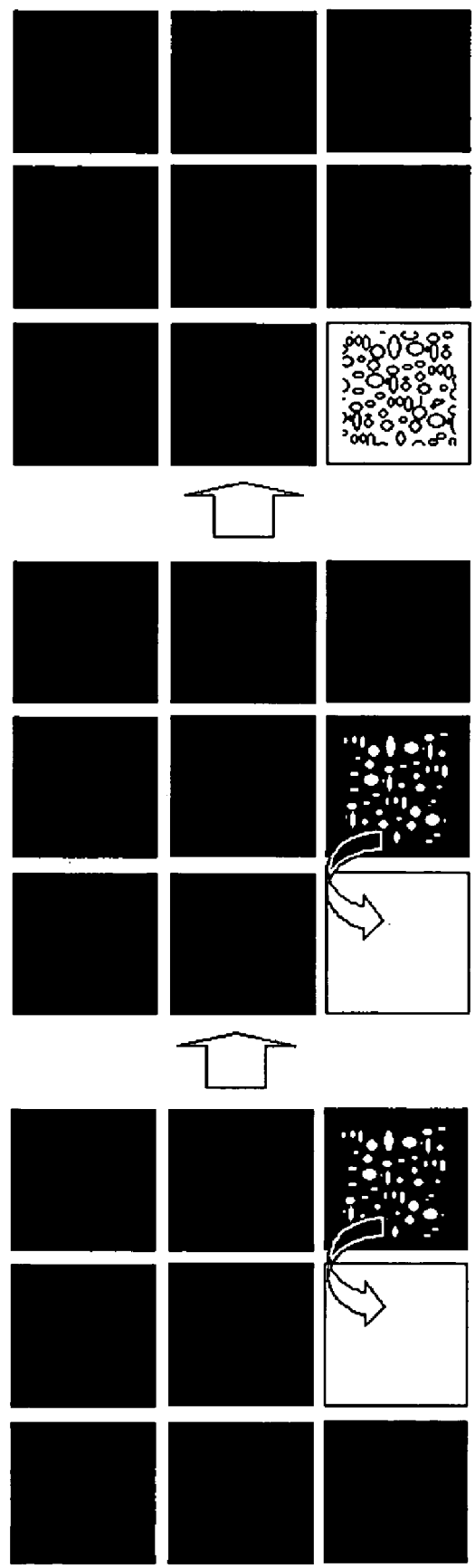
FIG. 3 illustrates how the charged pigment particles may move to the designated electrodes in steps.

The migration of the charged pigment particles to the designated electrode(s) may occur all at once, that is, the voltages of the common and driving electrodes are set at such to cause the charged pigment particles to migrate to be at or near the designated electrode(s) all at once. Alternatively, the migration may take place in steps. As shown in FIG. 3, the voltages of driving electrodes are set at such to cause the charged pigment particles to move from one driving electrode to an adjacent driving electrode one step at a time and eventually to the designated electrode(s). This driving method may prevent the charged pigment particles from being trapped at the center of one large driving electrode even though the large driving electrode has the same polarity as the pigment particles.

Figure 4:
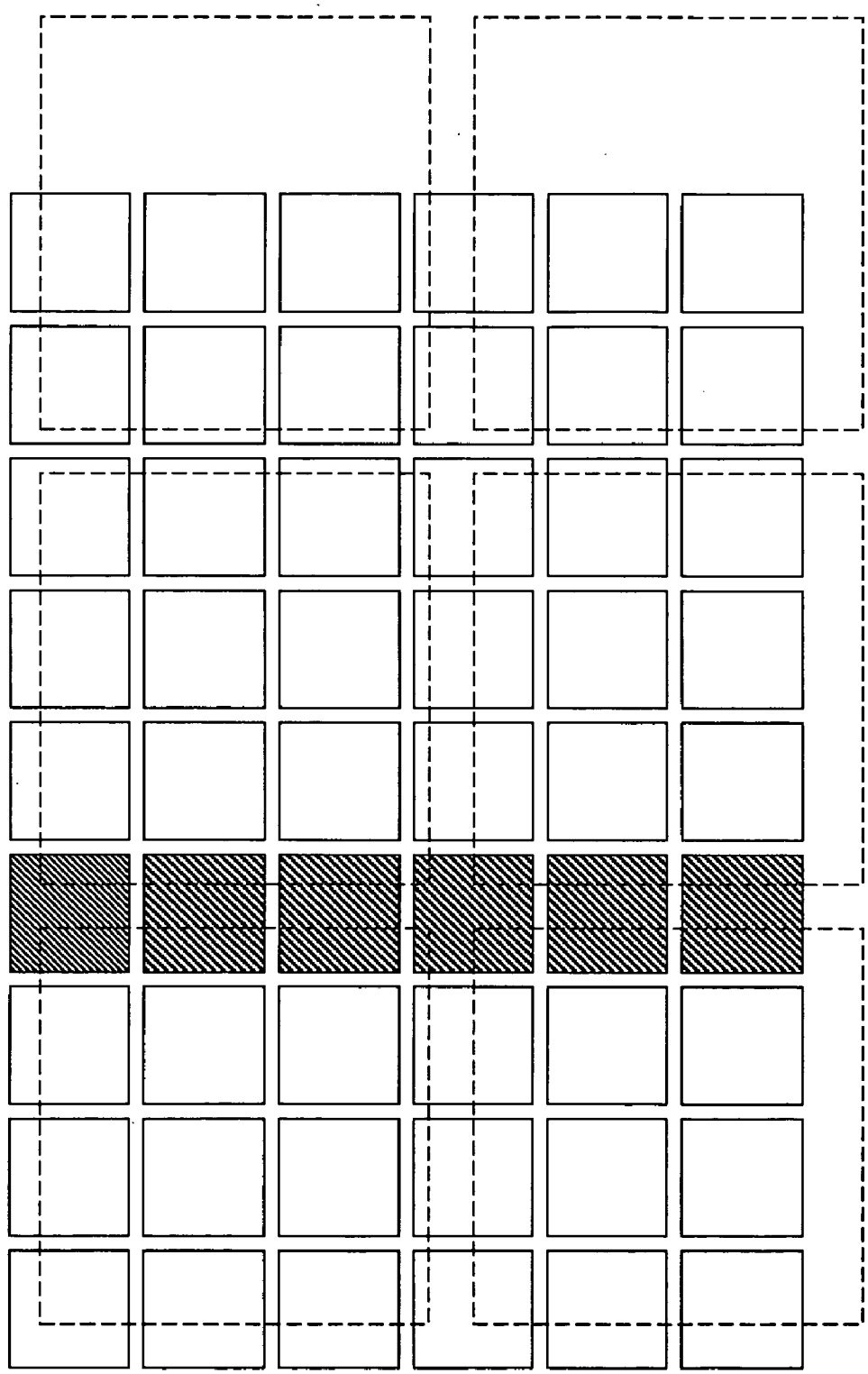
FIG. 4 depicts the driving electrodes not aligned with the boundaries of the display cells.

Another one of the advantages of the color display as described is that the driving electrodes do not have to be aligned with the boundary of the display cells. As shown in FIG. 4, the display cells (represented by the dotted lines) and the driving electrodes (represented by the solid lines) are not aligned. In this case, the charged pigment particles may still be driven to show the desired color states. To accomplish this, a scanning method or similar approaches may be used to first determine which driving electrodes address which display cell (i.e., pixel). For those driving electrodes (shaded in FIG. 4) at the edges of the display cells may never be used or may be used to drive only partial areas of the driving electrodes. However, in the latter case, cross-talk may occur.

In one embodiment of the present invention, there are blocking layer(s) on the viewing side of the color display. For example, the blocking layers may be black matrix layers (505a), as shown in FIG. 5a. The display cell (500) is sandwiched between a first layer (501) comprising a common electrode (503) and a second layer (502) comprising driving electrodes (504). The designated electrode (504cy) is shown to be located underneath the black matrix layer (505a). As a result, the charged pigment particles gathered at or near the designated electrode (504cy) will not be seen, from the viewing side. As the charged pigment particles have moved to gather at or near the designated electrode(s), only the color of the background layer (507) (e.g., black) is visible, from the viewing side.

The black matrix layer may be applied by a method such as printing, stamping, photolithography, vapor deposition or sputtering with a shadow mask. The optical density of the black matrix may be higher than 0.5, preferably higher than 1. Depending on the material of the black matrix layer and the process used to dispose the black matrix, the thickness of the black matrix may vary from 0.005 μm to 50 μm, preferably from 0.01 μm to 20 μm.

In one embodiment, a thin layer of black coating or ink may be transferred onto the surface where the black matrix layers will appear, by an offset rubber roller or stamp.

In another embodiment, a photosensitive black coating may be coated onto the surface where the black matrix layers will appear and exposed through a photomask. The photosensitive black coating may be a positively-working or negatively-working resist. When a positively-working resist is used, the photomask have openings corresponding to the areas not intended to be covered by the black matrix layer. In this case, the photosensitive black coating in the areas not intended to be covered by the black matrix layer (exposed) is removed by a developer after exposure. If a negatively-working resist is used, the photomask should have openings corresponding to the areas intended to be covered by the black matrix layer. In this case, the photosensitive black coating in the areas not intended to be covered by the black matrix layer (unexposed) is removed by a developer after exposure. The solvent(s) used to apply the black coating and the developer(s) for removing the coating should be carefully selected so that they do not attack the layer of the display and other structural elements.

Alternatively, a colorless photosensitive ink-receptive layer may be applied onto the surface where the black matrix layers will appear, followed by exposure through a photomask. If a positively-working photosensitive latent ink-receptive layer is used, the photomask should have openings corresponding to the areas intended to be covered by the black matrix layer. In this case, after exposure, the exposed areas become ink-receptive or tacky and a black matrix may be formed on the exposed areas after a black ink or toner is applied onto those areas. Alternatively, a negatively-working photosensitive ink-receptive layer may be used. In this case, the photomask should have openings corresponding to the areas not intended to be covered by the black matrix layer and after exposure, the exposed areas (which are not intended to be covered by the black matrix layer) are hardened while a black matrix layer may be formed on the unexposed areas (which are intended to be covered by the black matrix layer) after a black ink or toner is applied onto those areas. The black matrix may be post cured by heat or flood exposure to improve the film integrity and physical-mechanical properties.

In another embodiment, the black matrix may be applied by printing such as screen printing or offset printing, particularly waterless offset printing.

In another example, the blocking layers may be a brightness enhancement structure (508) comprising micro-structures or micro-reflectors (505b) on the viewing side of the display device, as shown in FIG. 5b. The display cell (500) is sandwiched between a first layer (501) comprising a common electrode (503) and a second layer (502) comprising driving electrodes (504). The designated electrode (504cy) is shown to be located underneath the micro-structure or micro-reflector (505b). As a result, the charged pigment particles gathered at or near the designated electrode (504cy) will not be seen, from the viewing side. When the charged pigment particles have moved to gather at or near the designated electrode(s), only the color of the background layer (507) (e.g., black) is visible, from the viewing side.

In the context of the present invention, the surface of the micro-structures is uncoated. The term "micro-reflector" refers to a micro-structure the surface of which is coated with a metal layer. Details of the brightness enhancement structure and how it is fabricated are given below.

The brightness enhancement structure may be fabricated in many different ways. In one embodiment, the brightness enhancement structure may be fabricated separately and then laminated over the viewing side of the display device. For example, the brightness enhancement structure may be fabricated by embossing as shown in FIG. 6a. The embossing process is carried out at a temperature higher than the glass transition temperature of the embossable composition (600) coated on a substrate layer (601). The embossing is usually accomplished by a male mold which may be in the form of a roller, plate or belt. The embossable composition may comprise a thermoplastic, thermoset or a precursor thereof. More specifically, the embossable composition may comprise multifunctional acrylate or methacrylate, multifunctional vinylether, multifunctional epoxide or an oligomer or polymer thereof. The glass transition temperatures (or Tg) for this class of materials usually range from about −70° C. to about 150° C., preferably from about −20° C. to about 50° C. The embossing process is typically carried out at a temperature higher than the Tg. A heated male mold or a heated housing substrate against which the mold presses may be used to control the embossing temperature and pressure. The male mold is usually formed of a metal such as nickel.

As shown in FIG. 6a, the mold creates the prism-like brightness enhancement micro-structures (603) and is released during or after the embossable composition is hardened. The hardening of the embossable composition may be accomplished by cooling, solvent evaporation, cross-linking by radiation, heat or moisture. In the context of the present invention, the cavity (603) is called a micro-structure.

The refraction index of the material for forming the brightness enhancement structure is preferably greater than about 1.4, more preferably between about 1.5 and about 1.7.

Figure 7A:
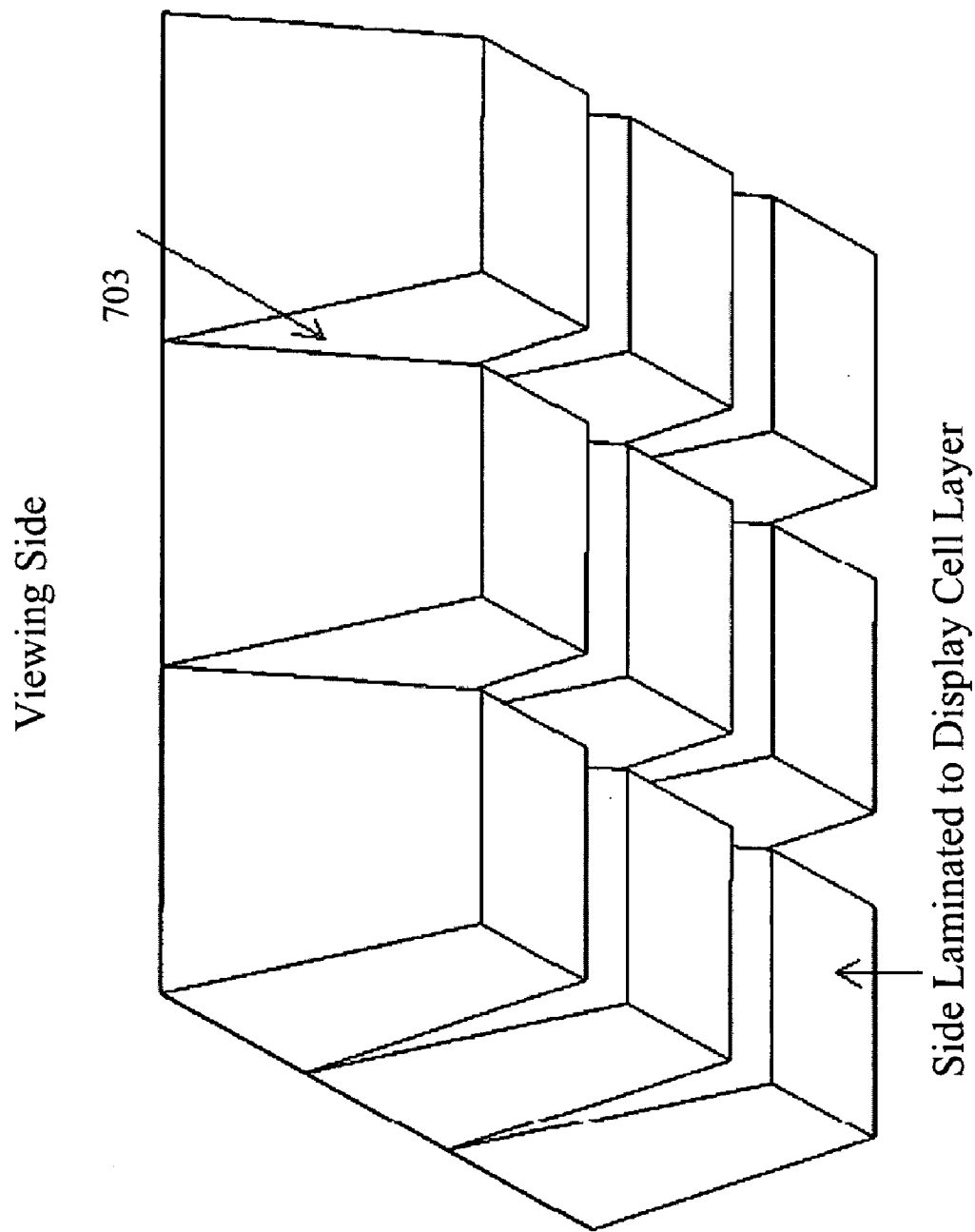
FIG. 7a is a three dimensional view of the brightness enhancement structure with micro-structures or micro-reflectors.

FIG. 7a is a three-dimensional view of a brightness enhancement structure comprising micro-structures or micro-reflectors (703). For brevity, the brightness enhancement structure of FIG. 7a may be referred to as a "two-dimensional" structure.

Figure 7B:
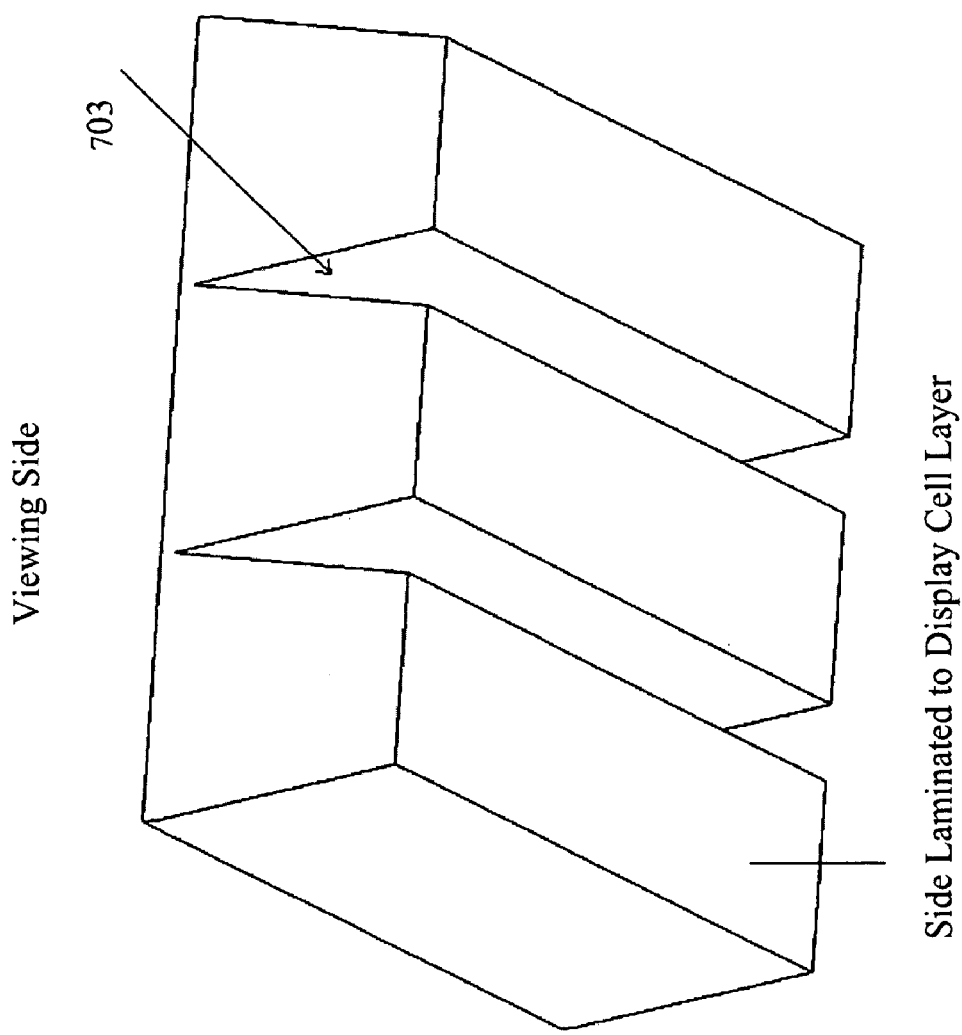
FIG. 7b is an alternative design of a brightness enhancement structure.

FIG. 7b is an alternative design of a brightness enhancement structure. The micro-structures or micro-reflectors are in a continuous form and therefore the structure may be referred to as a "one-dimensional" structure.

The brightness enhancement structure may be used as is or further coated with a metal layer.

The metal layer (607) is then deposited over the surface (606) of the micro-structures (603) as shown in FIG. 6b. Suitable metals for this step may include, but are not limited to, aluminum, copper, zinc, tin, molybdenum, nickel, chromium, silver, gold, iron, indium, thallium, titanium, tantalum, tungsten, rhodium, palladium, platinum and cobalt. Aluminum is usually preferred. The metal material must be reflective, and it may be deposited on the surface (606) of the micro-structures, using a variety of techniques such as sputtering, evaporation, roll transfer coating, electroless plating or the like.

Figure 6C:
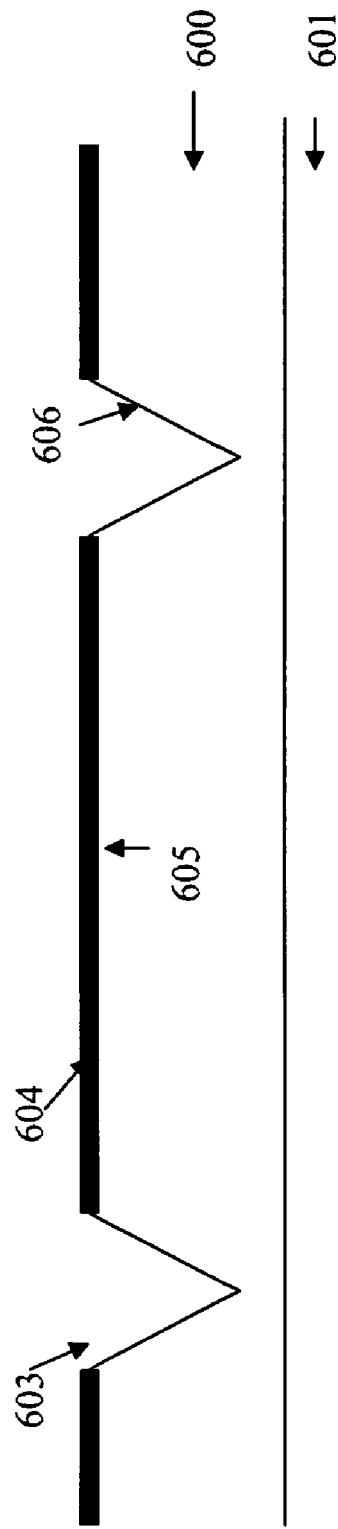

In order to facilitate formation of the metal layer only on the intended surface (i.e., the surface 606 of the micro-structures), a strippable masking layer may be coated before metal deposition, over the surface on which the metal layer is not to be deposited. As shown in FIG. 6c, a strippable masking layer (604) is coated onto the surface (605) between the openings of the micro-structures. The strippable masking layer is not coated on the surface (606) of the micro-structures.

The coating of the strippable masking layer may be accomplished by a printing technique, such as flexographic printing, driographic printing, electrophotographic printing, lithographic printing, gravure printing, thermal printing, inkjet printing or screen printing. The coating may also be accomplished by a transfer-coating technique involving the use of a release layer. The strippable masking layer preferably has a thickness in the range of about 0.01 to about 20 microns, more preferably about 1 to about 10 microns.

For ease of stripping, the layer is preferably formed from a water-soluble or water-dispersible material. Organic materials may also be used. For example, the strippable masking layer may be formed from a re-dispersible particulate material. The advantage of the re-dispersible particulate material is that the coated layer may be easily removed without using a solubility enhancer. The term "re-dispersible particulate" is derived from the observation that the presence of particles in the material in a significant quantity will not decrease the stripping ability of a dried coating and, on the contrary, their presence actually enhances the stripping speed of the coated layer.

The re-dispersible particulate consists of particles that are surface treated to be hydrophilic through anionic, cationic or non-ionic functionalities. Their sizes are in microns, preferably in the range of about 0.1 to about 15 μm and more preferably in the range of about 0.3 to about 8 μm. Particles in these size ranges have been found to create proper surface roughness on a coated layer having a thickness of <15 μm. The re-dispersible particulate may have a surface area in the range of about 50 to about 500 m$^2$/g, preferably in the range of about 200 to about 400 m$^2$/g. The interior of the re-dispersible particulate may also be modified to have a pore volume in the range of about 0.3 to about 3.0 ml/g, preferably in the range of about 0.7 to about 2.0 ml/g.

Commercially available re-dispersible particulates may include, but are not limited to, micronized silica particles, such as those of the Sylojet series or Syloid series from Grace Davison, Columbia, Md., USA.

Non-porous nano sized water re-dispersible colloid silica particles, such as LUDOX AM can also be used together with the micron sized particles to enhance both the surface hardness and stripping rate of the coated layer.

Other organic and inorganic particles, with sufficient hydrophilicity through surface treatment, may also be suitable. The surface modification can be achieved by inorganic and organic surface modification. The surface treatment provides the dispensability of the particles in water and the re-wettability in the coated layer.

Figure 6D:
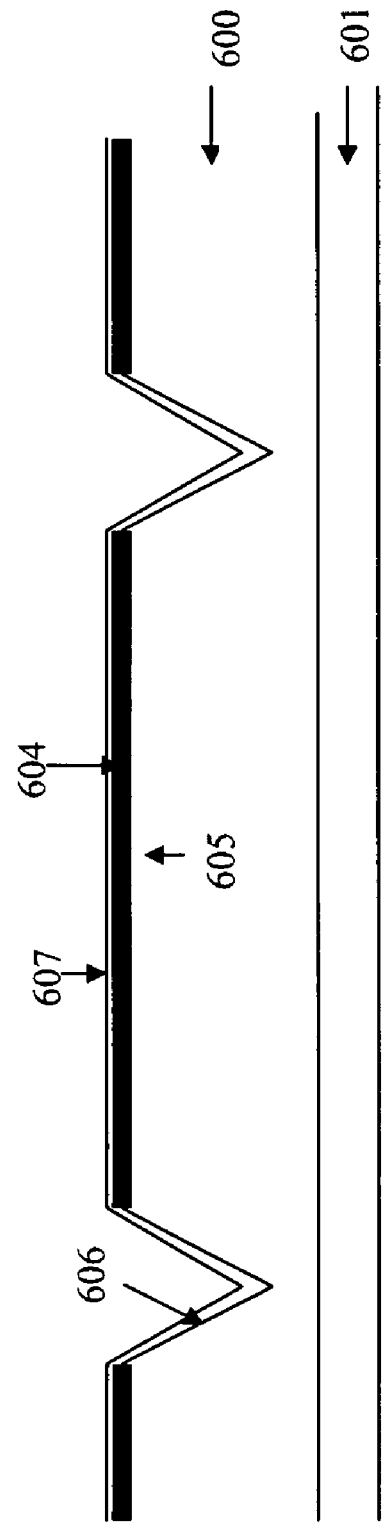

In FIG. 6d, a metal layer (607) is shown to be deposited over the entire surface, including the surface (606) of the micro-structures and the surface (605) between the micro-structures. Suitable metal materials are those as described above. The metal material must be reflective and may be deposited by a variety of techniques previously described.

Figure 6E:
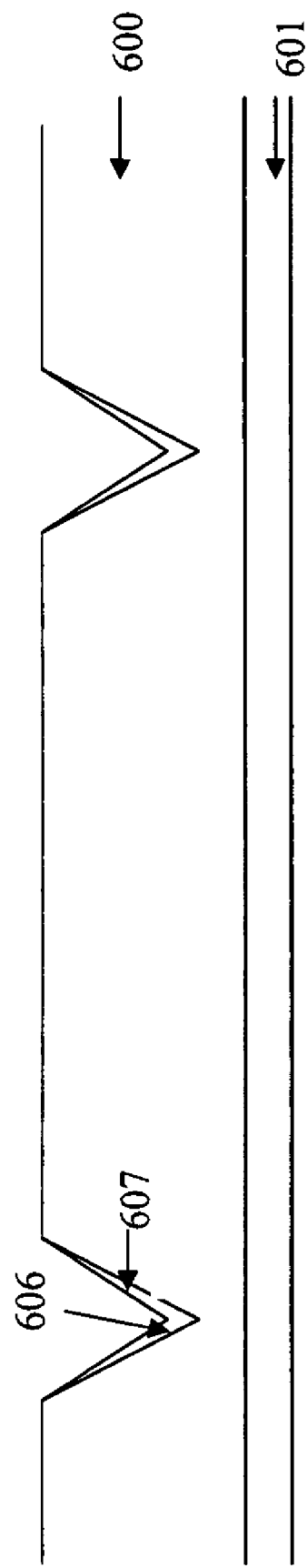

FIG. 6e shows the structure after removal of the strippable masking layer (604) with the metal layer 607 coated thereon. This step may be carried out with an aqueous or non-aqueous solvent such as water, MEK, acetone, ethanol or isopropanol or the like, depending on the material used for the strippable masking layer. The strippable masking layer may also be removed by mechanical means, such as brushing, using a spray nozzle or peeling it off with an adhesive layer. While removing the strippable masking layer (604), the metal layer (607) deposited on the strippable masking layer is also removed, leaving the metal layer (607) only on the surface (606) of the micro-structures.

Figure 6F:
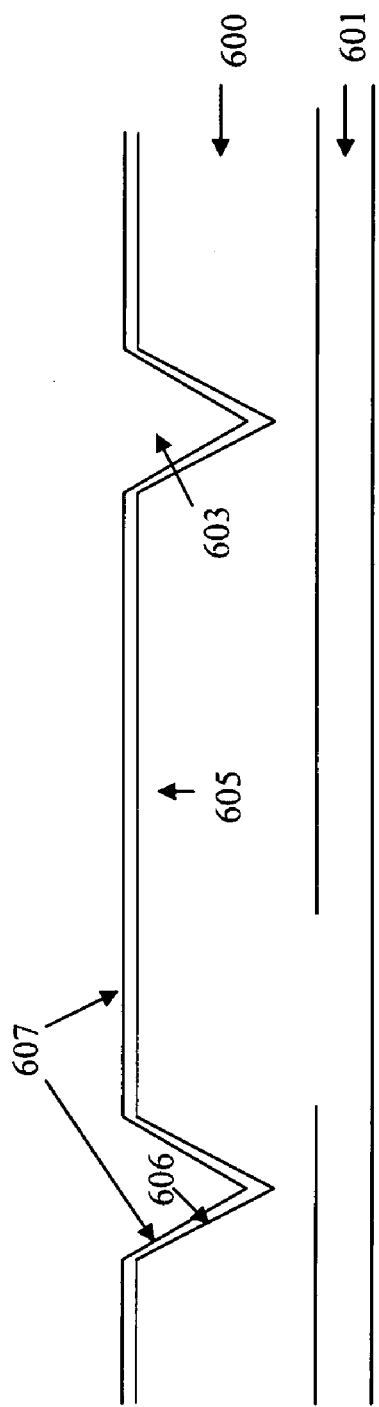
Figure 6G:
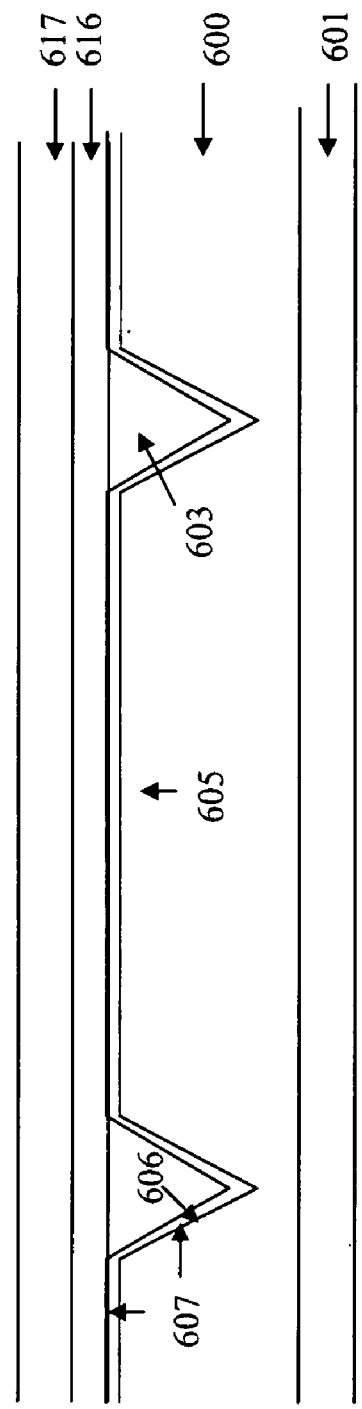

FIGS. 6f and 6g depict an alternative process for depositing the metal layer. In FIG. 6f, a metal layer (607) is deposited over the entire surface first, including both the surface (606) of the micro-structures and the surface (605) between the micro-structures. FIG. 6g shows that the film of micro-structures deposited with a metal layer (607) is laminated with a film (617) coated with an adhesive layer (616). The metal layer (607) on top of the surface (605) may be conveniently peeled off when the micro-structure film is delaminated (separated) from the adhesive layer (616) coated film (617). The thickness of the adhesive layer (616) on the adhesive coated film is preferably in the range of about 1 to about 50 μm and more preferably in the range of about 2 to about 10 μm.

The brightness enhancement structure comprising micro-structures (uncoated with a metal layer) or micro-reflectors (coated with a metal layer) is then laminated over a layer of display cells as described above.

FIG. 8a shows how the black matrix layers (803a) are aligned with the designated electrodes (802) to allow the designated electrodes to be hidden from the viewer. To achieve the "hiding" effect, the width (w1) of the black matrix layer (803a) must be at least equal to the width (w2) of the designated electrode(s) (802). It is desirable that the width (w1) of the black matrix layers is slightly greater than the width (w2) of the designated electrode(s) to prevent loss of contrast when viewed at an angle.

Figure 8B:
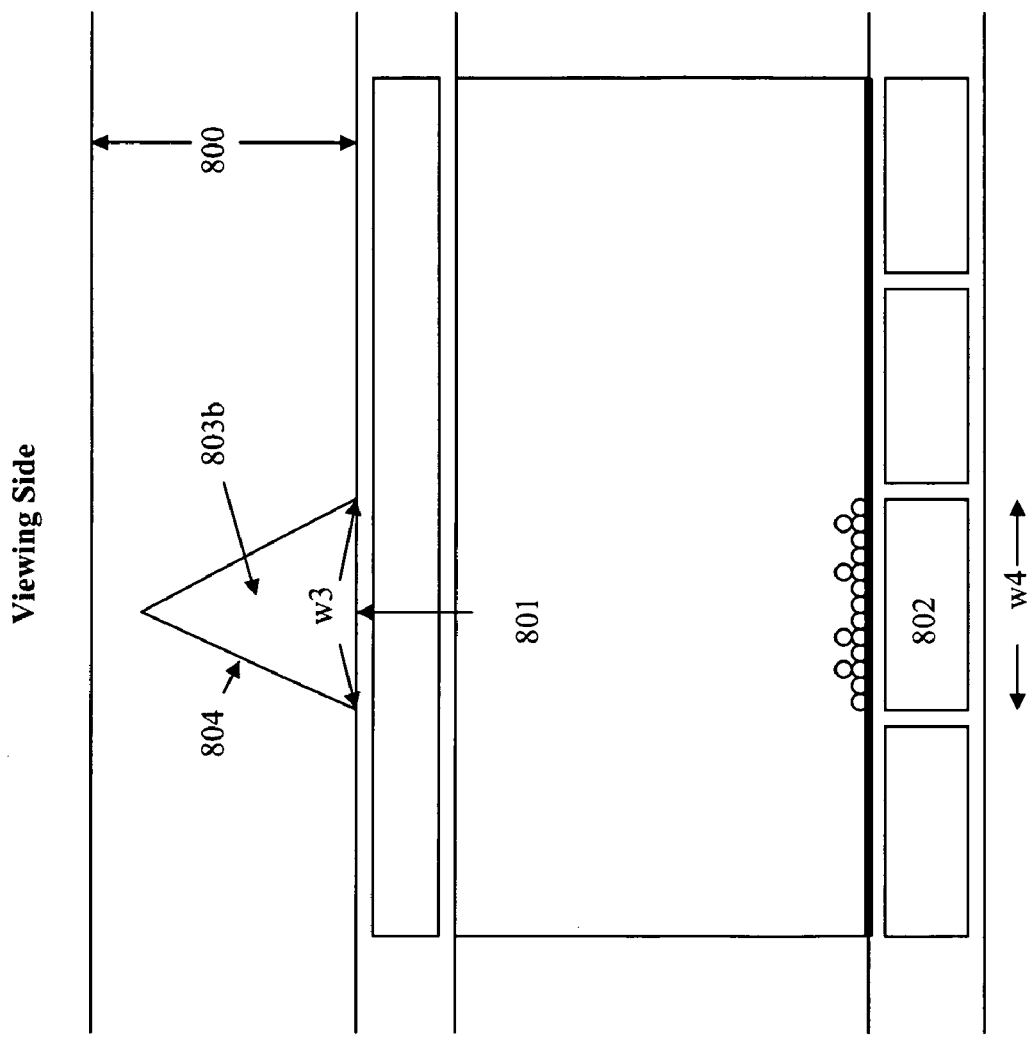

FIG. 8b shows how the micro-structures or micro-reflectors (803b) are aligned with the designated electrodes to allow the designated electrodes to be hidden from the viewer. To achieve the "hiding" effect, the width (w3) of the base (801) of the micro-structure or micro-reflector (803b) must be at least equal to the width (w4) of the designated electrode(s) (802). It is acceptable if the width (w3) of the base of the micro-structure or micro-reflector is slightly greater than the width (w4) of the designated electrode(s).

The brightness enhancement structure (800) is formed of a high refractive index material, and the tilted surface (804) is reflective to the incoming light source due to the total internal reflection (TIR) phenomenon. The area underneath the micro-structure or micro-reflector will not receive any light. During the state while the color of the background layer is shown, the charged pigment particles migrate to those designated electrodes underneath the micro-structures or micro-reflectors, thus avoiding light leakage.

In another embodiment, the black matrix layers or the micro-structures or micro-reflectors are not aligned with the designated electrodes. In this case, the width of the black matrix layers or the base of the microstructures or micro-reflectors is significantly greater than the width of the designated electrodes, so that the designated electrodes may be hidden from the incoming light.

Figure 9C:
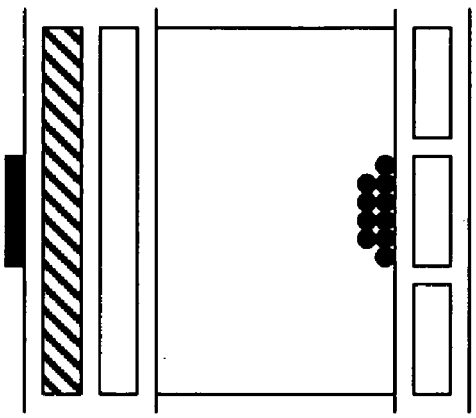
FIGS. 9a-9c depict a color display device with black matrix layers and color filters.
Figure 9B:
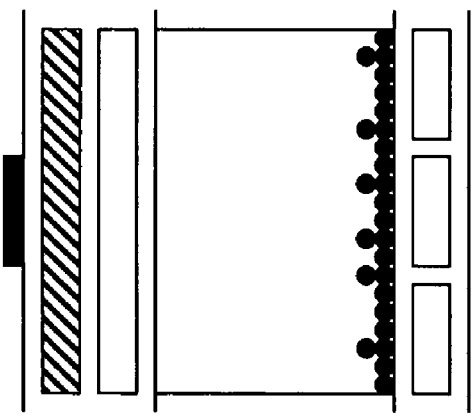
Figure 9A:
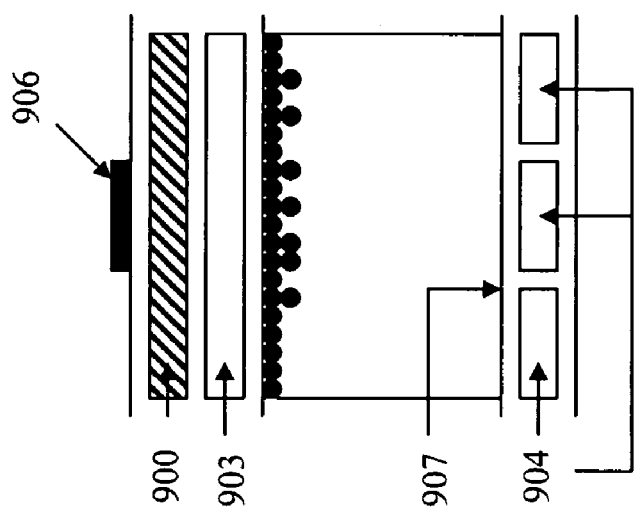

In a further aspect of the present invention, color filters are employed. In FIG. 9a, each of the display cells has a color filter (900). In one embodiment, the charged pigment particles may be of the black color, the dielectric solvent or solvent mixture in which the charged pigment particles are dispersed is clear and transparent, and the background (907) of the display cells may be of the white color.

In FIG. 9a, the voltages of the common (903) and driving (904) electrodes are set at such to cause the charged black particles to migrate to be at or near the common electrode and as a result, a black color (i.e., the color of the particles) is seen, from the viewing side. FIG. 9b provides an alternative way of achieving a black color. In FIG. 9b, the voltages of the common (903) and driving (904) electrodes are set at such to cause the charged black particles to migrate to be at or near the driving electrodes and as a result, a black color is seen, from the viewing side. In FIG. 9c, the voltages of the common (903) and driving (904) electrodes are set at such to cause the charged black particles to migrate to be at or near one or more designated electrode(s). The charged pigment particles gathered at or near the designated electrode(s) will not be seen, from the viewing side because of the presence of the blocking layers (e.g., black matrix layers 906). As the charged pigment particles have moved to gather at or near the designated electrode(s), the color seen from the viewing side would be the color of the color filter (900) as the display cell has a white background (907).

It is noted that other color combinations are also possible for this aspect of the invention. For example, the charged pigment particles may be of the white color; the dielectric solvent or solvent mixture in which the charged pigment particles are dispersed is clear and transparent; and the background of the display cells may be of the black color.

While not demonstrated in the figures, it is understood that the black matrix layers (906) in FIGS. 9a-9c may be replaced with a brightness enhancement structure with micro-structures or micro-reflectors.

The white color state will be resulted from mixing the red, green and blue colors.

The color filters (900) may be underneath the black matrix layers (as shown in FIGS. 9a-9c) or the brightness enhancement structure. The presence of the color filters could cause loss of light energy. The black matrix layers or a brightness enhancement structure helps to compensate the effect of such loss and provides improved on-axis brightness.

In addition, there are dead spots between color filters of different colors. When the black matrix layers or a brightness enhancement structure is used, the black matrix layers or the micro-structures or micro-reflectors may be aligned with the dead spots and therefore the dead spots could be hidden underneath the black matrix layers or the micro-structures or micro-reflectors, thus effectively increasing the aperture ratio of the display device.

Alternatively, the color filters may be placed on top of the black matrix layers or the brightness enhancement structure.

Figure 10C:
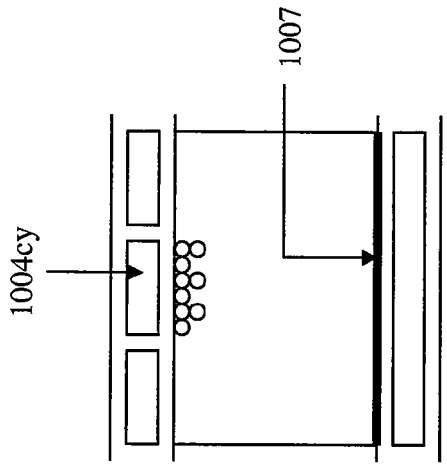
FIGS. 10a-10c depict an alternative design of color display devices.
Figure 10B:
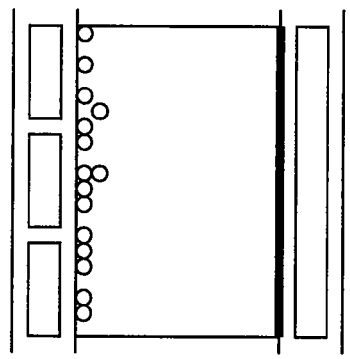
Figure 10A:
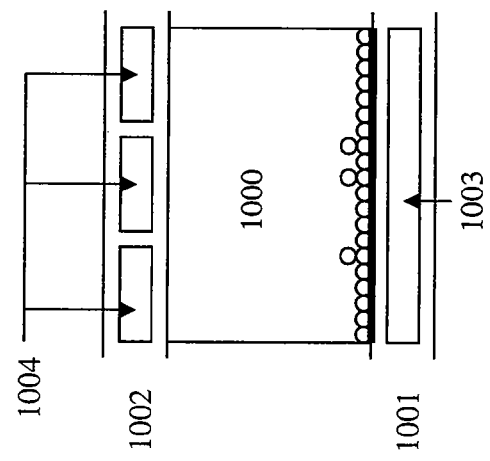

FIGS. 10a-10c depict an alternative design of color display devices. In this alternative design, the color display device does not require black matrix layers or a brightness enhancement structure.

The display cell (1000), in this design, is also sandwiched between a first layer (1001) and a second layer (1002). The first layer comprises a common electrode (1003). The second layer comprises more than one driving electrodes (e.g., 1004cx, 1004cy and 1004cz as shown). As shown the color display device is viewed from the driving electrode side (i.e., the second layer) instead of the common electrode side (i.e., the first layer).

The driving electrode layer also comprises multiple driving electrodes as shown in FIG. 1b. While only a 3×3 grid is shown in FIG. 1b, the driving electrodes may be of a grid which is at least 2×2. The multiple driving electrodes within a display cell allow the particles to migrate to one or more designated electrodes or evenly spread over all the driving electrodes.

In this design, the driving electrodes are transparent and the designated electrode(s) is/are non-transparent. The designated electrodes may be opaque.

There is also a background layer (1007) in the display cell to provide a background color. The background layer may be on top of the common electrode (as shown) or underneath the common electrode (not shown). The layer of the common electrode may also serve as the background layer.

For illustration purpose, it is assumed that the charged pigment particles are of the white color, the dielectric solvent or solvent mixture in which the pigment particles are dispersed is colored (e.g., red, green or blue), and the background layer is of the black color. The features and associated numbers in FIGS. 10a, 10b and 10c are identical.

In FIG. 10a, the voltages of the common (1003) and driving (1004) electrodes are set at such voltage to cause the charged white particles to migrate to be at or near the common electrode (1003) and as a result, the color of the solvent is seen through the transparent driving electrodes, from the viewing side.

In FIG. 10b, the voltages of the common (1003) and driving (1004) electrodes are set at such to cause the charged white particles to migrate to be at or near the driving electrodes (1004s) and as a result, the color of the pigment particles is seen through the transparent driving electrodes, from the viewing side.

In FIG. 10c, the voltages of the common (1003) and driving (1004) electrodes are set at such to cause the charged pigment particles to migrate to be at or near the designated electrode (e.g., 1004cy). As a result, the color of the background will be seen through the transparent driving electrodes, from the viewing side. While only one driving electrode (1004cy) is shown to be designed for this purpose, in practice, the number of such designated electrodes may be more than one. In other words, there may be one or more such designated electrodes.

Another aspect of the present invention provides an alternative design of FIG. 1b. For example, the driving electrodes 104ax, 104ay, 104az, 104bx, 104bz, 104cx, 104cy and 104cz in FIG. 1b may be connected and the connected pieces, as a whole, acts as one non-designated electrode. In this example, the center electrode 104by is the designated electrode. This alternative design has the advantage that there are fewer addressing points that are needed, thus reducing the complexity of the electrical circuit design. It is also noted that the one non-designated electrode may consist any of the 9 driving electrodes connected together. The number of the designated electrode also is not limited to one. If there is more than one driving electrode which is the designated electrode, the designated electrodes preferably are also connected. But in any case, the connected non-designated electrode must be larger in area than the designated electrode. In addition, the designated electrode and the non-designated electrode, in this case, must be aligned with the boundary of the display cells.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective and scope of the present invention. All such modifications are intended to be within the scope of the claims appended hereto.

What is claimed is:

1. A display device comprising a plurality of display cells filled with a display fluid comprising charged pigment particles dispersed in a solvent or solvent mixture, wherein each of said display cells is sandwiched between a first layer comprising a transparent common electrode and a second layer comprising a plurality of driving electrodes and at least one of the driving electrode is a designated electrode, and said display device further comprises blocking layers on its viewing side and said blocking layers are located only in positions corresponding to the designated electrodes to allow the charged pigment particles gathered at or near the designated electrode not to be seen from the viewing side.

2. The display device of claim 1, wherein said blocking layers are black matrix layers.

3. The display device of claim 2, wherein the width of the black matrix layer is equal to or greater than the width of the designated electrode.

4. The display device of claim 1, wherein said blocking layers are micro-structures or micro-reflectors of a brightness enhancement structure.

5. The display device of claim 4, wherein the width of the base of the micro-structure or micro-reflector is equal to or greater than the width of the designated electrode.

6. The display device of claim 4, wherein said brightness enhancement structure is two-dimensional.

7. The display device of claim 4, wherein said brightness enhancement structure is one-dimensional.

8. The display device of claim 1, wherein each display cell is capable of displaying the color of the charged pigment particles, the color of the solvent or solvent mixture or a background color.

9. The display device of claim 8, wherein the background color is of the black color.

10. The display device of claim 1, wherein said driving electrodes are not aligned with the boundary of the display cells.

11. The display device of claim 1, wherein said driving electrodes are aligned with the boundary of the display cells.

12. The display device of claim 1, wherein the charged pigment particles move to the designated electrode(s) all at once.

13. The display device of claim 1, wherein the charged pigment particles move to the designated electrode(s) in steps.

14. The display device of claim 1, wherein the charged pigment particles are of the white color.

15. The display device of claim 1, further comprising color filters.

16. The display device of claim 15, wherein said charged pigment particles are of the white color.

17. The display device of claim 15, wherein said charged pigment particles are of the black color.

18. The display device of claim 1, wherein said driving electrodes are a grid of at least 2×2.

19. The display device of claim 1, wherein the first layer is on the viewing side.

20. The display device of claim 1, wherein some of the driving electrodes are connected as one non-designated electrode and the remaining one driving electrode is the designated electrode.

21. The display device of claim 1, wherein some of the driving electrodes are connected as one non-designated electrode and the remaining driving electrodes are connected as one designated electrode.

22. A display device, which
   (a) comprises a plurality of display cells filled with a display fluid comprising charged pigment particles dispersed in a solvent or solvent mixture and a background layer on the non-viewing side, wherein each of said display cells is sandwiched between a first layer comprising a common electrode and a second layer comprising a plurality of driving electrodes, at least one of the driving electrodes is a non-transparent designated electrode, and the remaining driving electrodes are transparent; and
   (b) is viewed from the side of the second layer and the color of the background layer is seen when the charged pigment particles migrate to gather at or near the non-transparent designated electrode.

23. The display device of claim 22, wherein said non-transparent designated electrode is opaque.

* * * * *